Dec. 2, 1941.　　　F. A. ROSS　　　2,264,586
CATAMENIAL DEVICE
Filed June 24, 1937　　　4 Sheets-Sheet 1
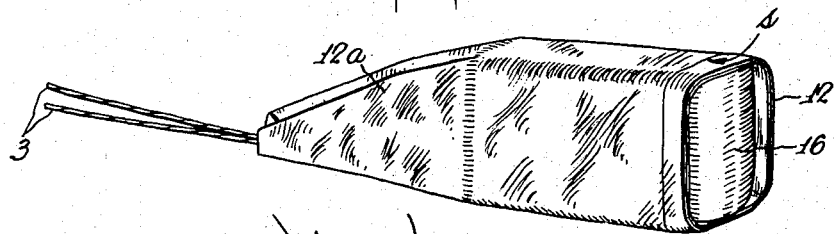
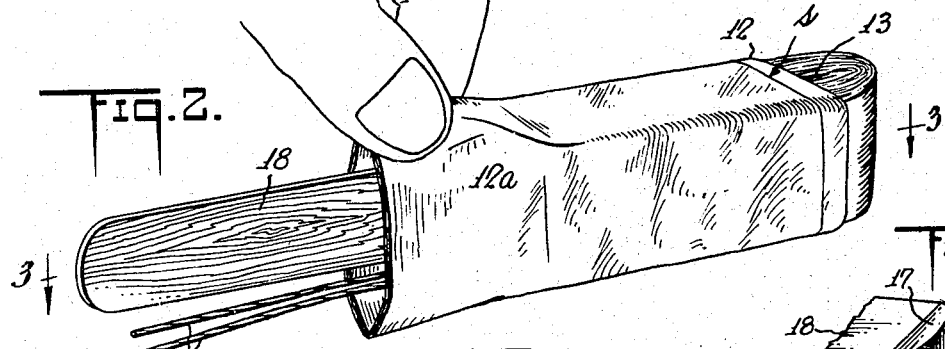
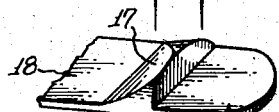
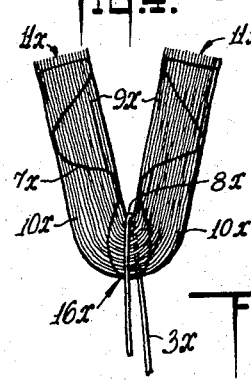
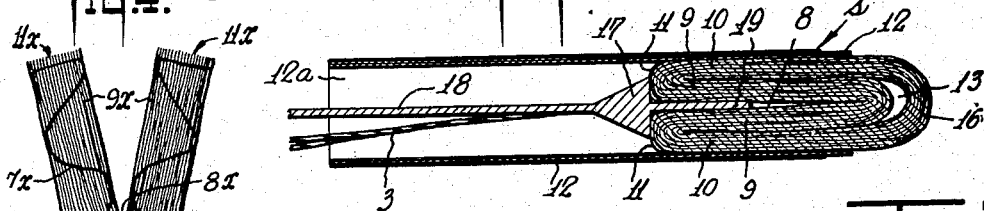
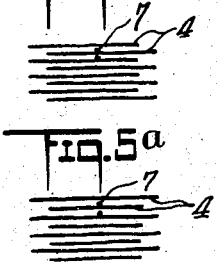
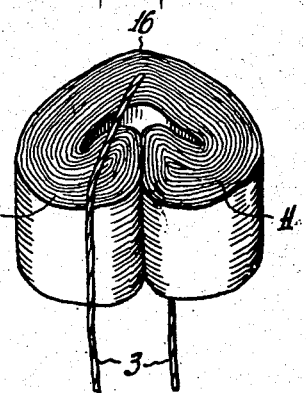
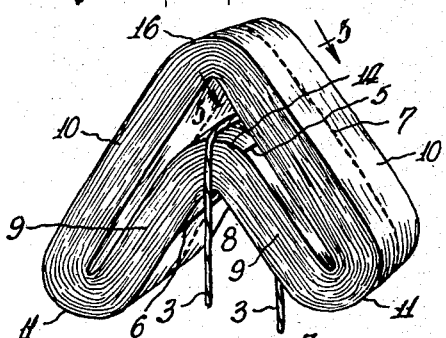
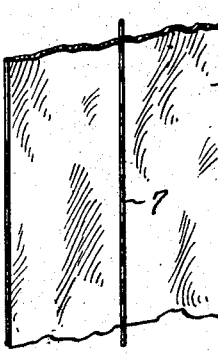
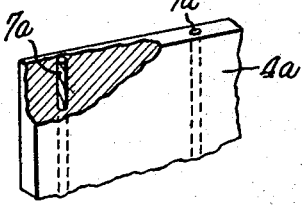
INVENTOR
Frederick Alexander Ross
BY
ATTORNEY Dec. 2, 1941.  F. A. ROSS  2,264,586
CATAMENIAL DEVICE
Filed June 24, 1937    4 Sheets-Sheet 2
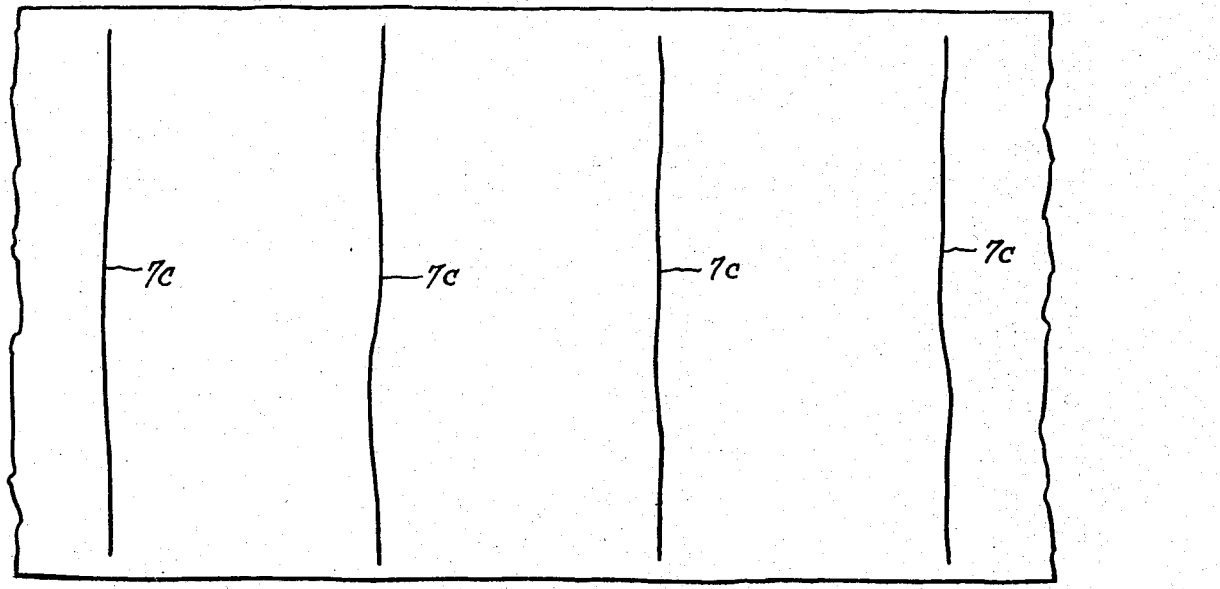
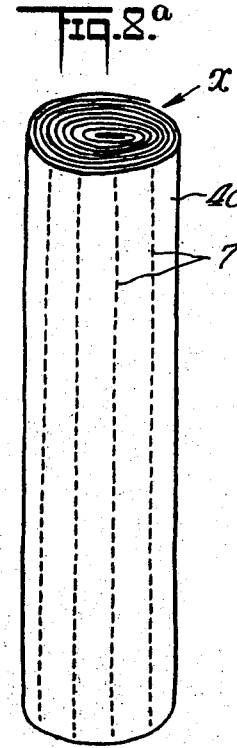
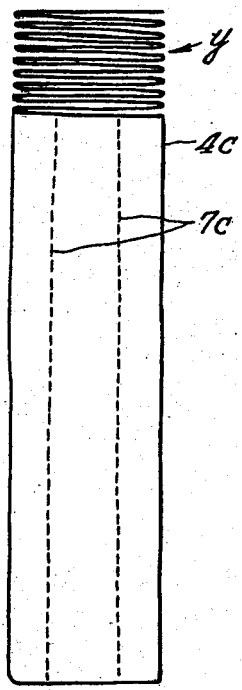
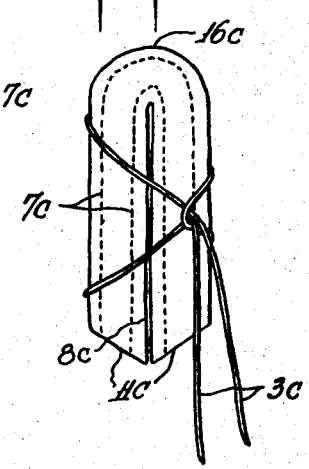
INVENTOR
Frederick Alexander Ross
BY
ATTORNEY Dec. 2, 1941.   F. A. ROSS   2,264,586
CATAMENIAL DEVICE
Filed June 24, 1937   4 Sheets-Sheet 3
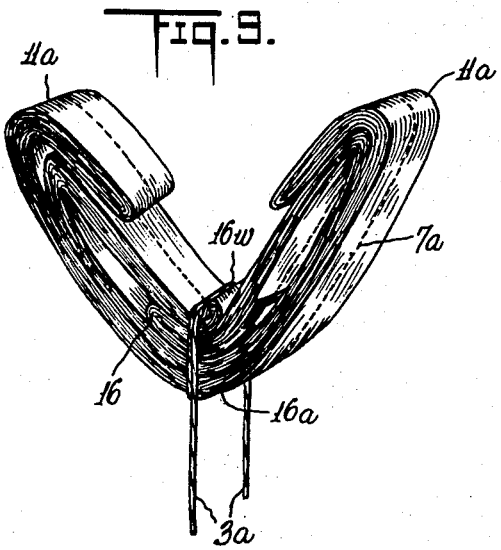
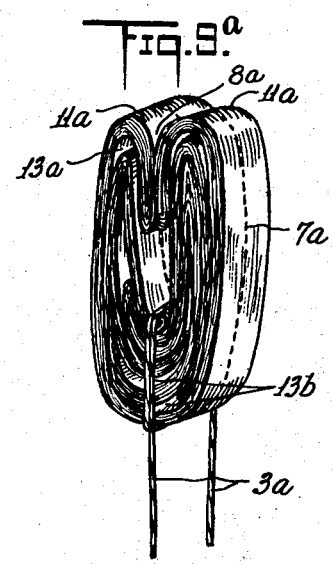
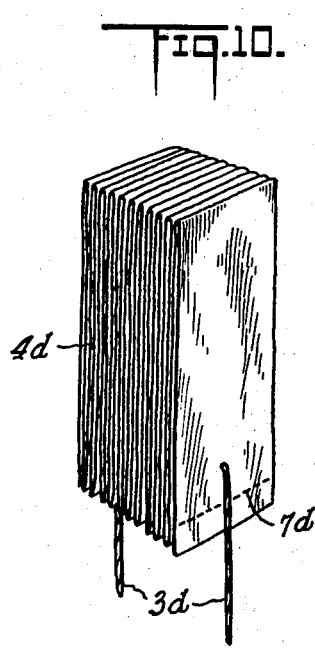
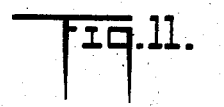
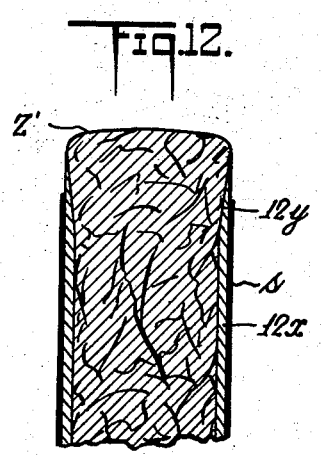
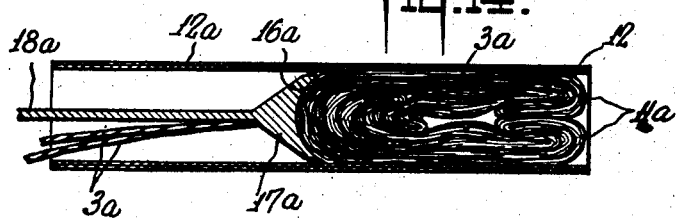
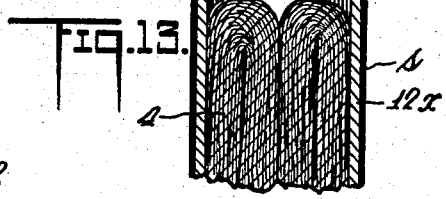
INVENTOR
Frederick Alexander Ross
BY
ATTORNEY Dec. 2, 1941.　　　　　F. A. ROSS　　　　2,264,586
CATAMENIAL DEVICE
Filed June 24, 1937　　　　4 Sheets-Sheet 4
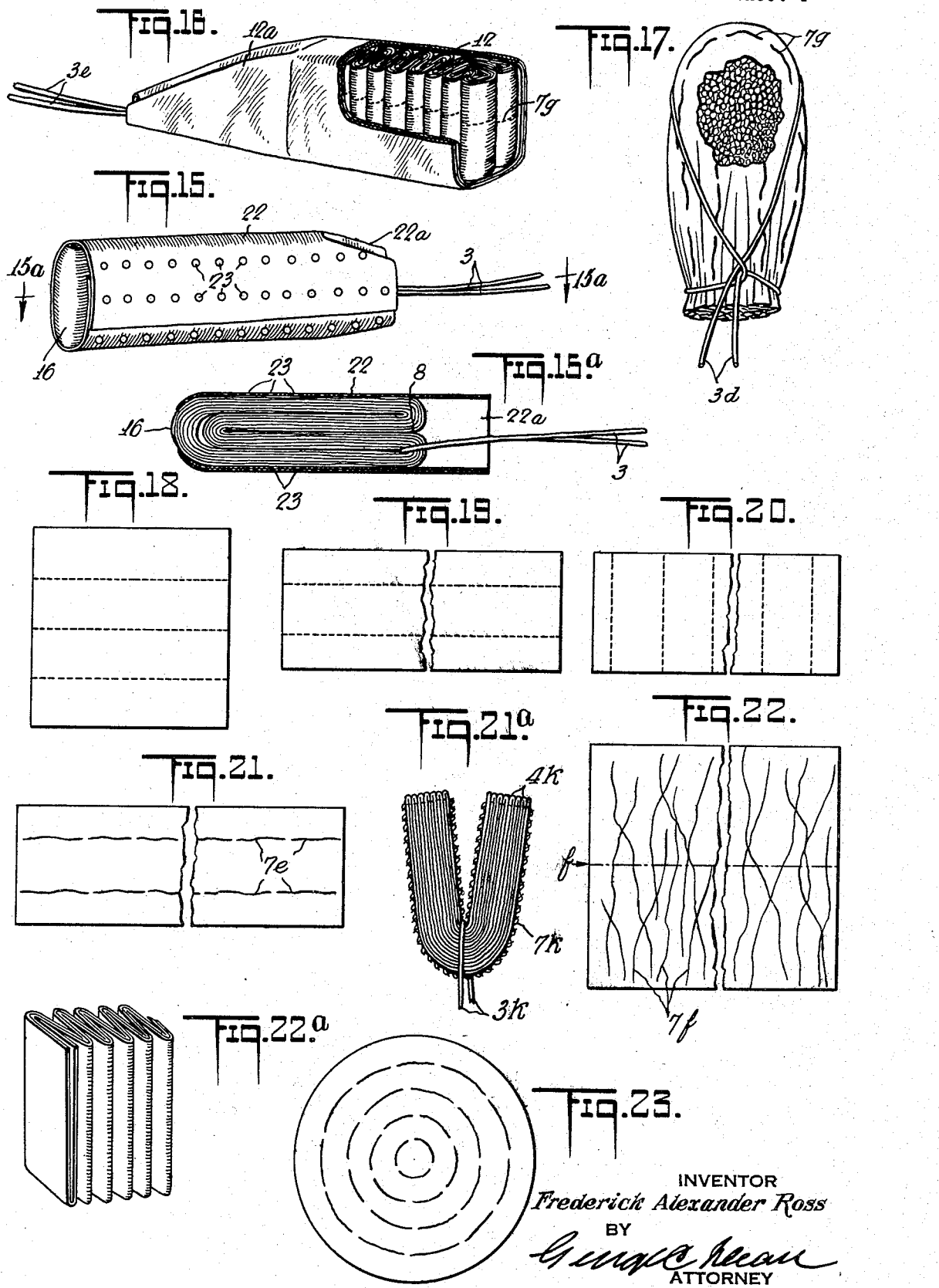
INVENTOR
Frederick Alexander Ross
BY
ATTORNEY Patented Dec. 2, 1941

2,264,586

UNITED STATES PATENT OFFICE 2,264,586

CATAMENIAL DEVICE

Frederick Alexander Ross, Barrie, Ontario, Canada

Application June 24, 1937, Serial No. 150,065

1 Claim. (Cl. 128—285)

My present invention relates to catamenial devices and packs of the general type set forth in my early application, Ser. No. 481,921, filed September 15, 1930; and in its continuation in part, application Ser. No. 622,359, filed July 13, 1932, now Patent 2,092,427 and this application is a continuation in part of said latter application.

The packs are primarily designed for absorbing catamenial fluids in the easily enlarged upper portion of the vagina, and a novel material for this purpose is highly porous vegetable matter in forms readily disintegrable in running water; as, for instance, very porous paper-like material, preferably very thin, preferably made wholly or mostly from wood pulp, preferably ground wood pulp, preferably like creped toilet paper. The paper-like material is preferably piled, wound, folded, crumpled or otherwise loosely assembled and shaped or confined in a multiplicity of thicknesses, adjacent surfaces of which are in slip contact relation, whereby when laterally confined, the dry pack has substantial stiffness, but when unconfined, is readily disassembled by running water; and when released in said enlarged upper part of the vagina the pack can bend, unfold, and crack open, and the surfaces can slip on one another, to form fluid storage interspaces and to accommodate the shape of the pack to the shape of the cavity.

Another feature is enclosing a pack of the above type in a tubular applicator which may be a sheath in the form of a paper wrapper which laterally confines the folds or layers of the paper, to hold them closely assembled to the form of a relatively stiff pack, and which keeps the pack substantially dry during its insertion within the vagina; and the exterior of said wrapper may be partially or wholly coated with a dried coating of some water-soluble lubricant, such as gum, gelatin, starch paste or the like. Preferably, the pack is formed and assembled with the wrapper in such a way that the pack will be endwise slidable therein, and an instrument is preferably provided for forcing the pack from the sheath, after the pack and the sheath have been inserted the required distance within the vagina.

Another feature is flexible means associated with the pack for withdrawing it after use, for instance, a pull string looped around or through the pack and pendent through the mouth of the vagina, whereby tension may be effectively applied to enough of the fluid-softened layers to effect withdrawal of the pack through the lower muscularly restricted portion of the vagina.

Another feature is slough preventing means, such as thread, arranged to transmit withdrawal tension along and among the layers sufficiently to ensure withdrawal of all parts of the pack.

The above and other features of my invention may be more fully understood from the following detailed description in connection with the accompanying drawings.

Fig. 1 is a perspective view of a wrapper form of sheath enclosing a pack with a withdrawal string at the rear end of the wrapper;

Fig. 2 is a perspective view, and Fig. 3 is a longitudinal section on the line 3—3, Fig. 2, showing a wrapper, pack and withdrawal string like those shown in Fig. 1, and, in combination therewith, a special form of ejecting instrument shown in fragment perspective in Fig. 3a fitting against and into the rear end of the pack to form a splice joint therewith;

Fig. 4 is a perspective view of a pack such as shown in the preceding figures, but partially unfolded;

Fig. 4a shows a modified form of pack;

Figs. 5 and 5a are sections on line 5—5, Fig. 4, showing diagrammatically how paper strips may project at the edges;

Fig. 6 is a detail view showing a length of the paper with a slough preventing thread extending lengthwise thereof;

Fig. 6a is a detail view on a very large scale and partly in section, showing paper having slough preventing threads incorporated with the paper;

Fig. 7 is a perspective view of the preferred form of pack when in its preferred location;

Fig. 8 is a face view of paper of any desired length and width, having slough preventing threads arranged transversely thereof;

Figs. 8a, 8b, 8c and 8d are face views illustrating forms of pack that may be made when a sheet like Fig. 8 is approximately twice as wide as the length of the desired pack, Figs. 8a, 8b and 8c showing respectively how the paper may be wound or reversely plicated, or crumpled and compressed and thereafter bent to U-shape as in Fig. 8d, to form a pack of a length which is half the width of the paper;

Fig. 9 is a perspective view of a modified arrangement for multiple folding of a pack;

Fig. 9a is a perspective view like in Fig. 9, but showing the pack more completely folded;

Fig. 10 is a perspective view of a pack formed by plicating or multiple reverse folding of multiple layers of paper;

Fig. 11 is a similar view of a cylindrical pack formed by crumpling any area of the paper, sufficient for a pack and then compressing it to the required volume and proportions;

Fig. 12 is a longitudinal sectional view of the exit portion of a tubular applicator the exit opening of which is internally thinned or coned, showing also a pack compressed therein;

Fig. 13 is a similar longitudinal sectional view of a similar applicator having the exit end coned exteriorly instead of interiorly, the pack therein being like that of Fig. 3, but having the two reverse bends presented toward the exit;

Fig. 14 is a longitudinal section of a sheath like Fig. 3, containing a pack like Fig. 9, and showing a modified form of ejector adapted for use when a blunt, or rounded, or single U-bend of a multiple bend pack is presented toward the rear of the sheath;

Fig. 15 is a perspective view of a pack with perforated sheath adapting it for digital insertion and use in the vagina, without ejecting the pack from the sheath;

Fig. 15a is a longitudinal section on line 15a—15a, Fig. 15;

Fig. 16 is a view like Fig. 1, but showing the sheath partly broken away; to show modified form of pack therein;

Fig. 17 is a side elevation, partly in section, showing a pack comprising exterior absorbent paper enclosing more or less comminuted absorbent material, such as confetti-like bits of the paper;

Figs. 18, 19, 20, 21 and 22 are face views of sheets of paper of various sizes and shapes, having slough preventing threads associated therewith in various ways;

Fig. 21a is a sectional view of a pack that may be formed by various ways of folding paper having other slough preventing means;

Fig. 22a is a similar view of a pack that may be formed by folding a sheet such as shown in Fig. 22;

Fig. 23 is a face view of a circular sheath associated with concentrically arranged slough preventing threads and adapted for use in building up multiple layers adapted to form the exterior retaining envelope for a pack such as shown in Fig. 17.

Figs. 1 to 6 inclusive disclose the pack, slough preventing threads, withdrawal string, sheath, and ejector, substantially the same as shown or described in connection with Figs. 1, 2, 3, 4, 5, 6, 10 and 12 of said allowed application; and the same reference numerals are used herein, to indicate the same parts.

For convenience, the same set of reference numerals is used to indicate similar elements having similar or analogous functions, in the various modifications shown in Figs. 8 to 23, but the sets are distinguished by adding index letters which are different for each set, but are the same for all numerals of the same set.

Referring first to Figs. 1 to 4: The complete device includes a pack preferably formed as in Fig. 4; also said pack in combination with a flexible paper wrapper wherein it is flattened and laterally confined as in Fig. 1; also said pack confined in any applicator, specifically, said paper wrapper, in combination with an ejector and manipulator, as in Fig. 3a, forming a detachable splice joint, by thrust engagement with the rear of the pack, and by lateral engagement between interior layers of the pack, as in Fig. 3.

Referring to Fig. 4, it will be evident that the pack primarily comprises one or more strips of paper of approximately the width of the desired pack. This paper is wound more or less loosely in ring form, the outerlayers being preferably looser than those nearer the interior. The diameter of the ring is determined by the desired length of the pack, and the number of windings is calculated to supply about one-quarter the thickness desired for the pack.

One side of the ring is folded inward as shown at 8, Fig. 4. The ends, 5, 6, of the paper strip, are preferably arranged to overlap on adjacent opposite faces of the inward fold 14, and at this or some other point a withdrawal string 3, 3, is looped transversely around the windings of the ring, so as to be readily detachable and discardable after use. The loop may encircle the windings one and one-half turns, instead of a half turn.

Preferably also slough preventing means such as thread 7, shown in Figs. 4, 5 and 6 is associated with the windings, preferably by being wound between some of the layers near the exterior, as indicated in Figs. 4, 5 and 6. The winding is preferably such as to stagger the edges of the outer layers so that the longitudinal corners of the pack will be rounded.

When one side of the ring is folded inward as shown in Fig. 4, there are two adjacent interior layers, 9, 9, connected by the U-bend, 14, and two exterior layers connected by the U-bend 16; and the exterior layers are connected with the interior layers by the two U-bends 11, 11.

Such a pack may be inserted into the vagina in any desired way, but it is particularly designed to be flattened to bring the layers into parallelism so that the re-entrant space 8 becomes a mere sulcus, as shown in Fig. 3. The pack is thus particularly adapted for use in combination with a sheath, which may be a single thickness tube of very thin, tough paper, but it is preferably such as shown in Figs. 1, 2 and 3.

The sectional view, Fig. 3, shows the layers thus flattened and confined by a wrapper, 12, the folding being preferably such that interior layers 9, 9, are shorter than the exterior layers, so as to leave a space 13 between the U-bend of the interior fold 14 and the interior bend of exterior fold 16. This construction may be for the purpose of permitting the apex of the posterior segment 9 to act as a wedge to start the spread of the anterior segment 10 when the pack is being deformed to its transverse elongation as counter pressure is being exerted on the apex 16 through contact thereof with the vaginal vault.

Such a pack and such a wrapper is particularly adapted for use in combination with the ejector comprising a head 17 for thrust engagement with the rearward U-bends 11, 11, rearwardly projecting handle 18 through which the thrust is applied, and a forwardly projecting flat portion 19 fitting into the sulcus 8 between layers 9, 9, so as to form an effective but readily detachable splice joint with the pack. As shown in Fig. 3a, the head 17 preferably extends substantially across the ends 11, 11, and is tapered down to the handle 18 so as to facilitate the withdrawal with the sheath 12, and to avoid any possibility of the pack being then withdrawn. The flat projection 19 is preferably of similar width at the base, but preferably terminates in a rounded forward end.

The thrust head 17, and the splice joint of the flat portion 19 with the sulcus 8, are of particular importance as concerns the method of use of the pack. As previously explained, the paper pack has substantial stiffness, when and where confined by the wrapper, but the rear end of the wrapper is only a flexible tension member. Hence the desirability of the effective, but readily detachable splice joint within the wrapper, whereby the direction of movement of the pack can be controlled through the exteriorly-projecting handle, notwithstanding the flexibility of the wrapper itself. The splice joint is structurally effective, so long as the rear end of the pack is within the wrapper, and forward thrust is exerted through the handle and said thrust is opposed either by contact of the pack or the wrapper with the vagina or by traction on the withdrawal string.

In this connection it is to be noted that the walls of the vagina canal are normally in a position of collapse through the lower three-fourths to four-fifths its length; and the lower third is surrounded by contractile muscular tissue which keeps it closed, while the upper portion is easily dilated. As the walls of this canal are very sensitive, the above described paper pack confined by its paper wrapper, is well adapted for dilating the muscularly contractile portion thereof; and the ejector when splice-jointed thereto as above described, is an effective means for directing the pack and wrapper, while the upper end thereof is being forced through this muscle gripped lower third of the vaginal canal.

Thereafter tension is applied to the rear end of the wrapper, and the ejector is used to push it into the easily enlarged upper portion of the vagina. As soon as the end of the pack is obstructed by contact with the vaginal vault, continued endwise pressure of the ejector causes the layers to unfold, crack open, and slip on one another to accommodate the shape of the pack, to the shape of the cavity.

Preferably the pack is inserted with its laminae parallel with the fore and aft vertical plane of the body, so that when pushed against the vaginal vault, it will assume a rearwardly inclined position, with one edge-formed face fitting against the mouth of the uterus, and the other against the opposite wall of the vagina, thus affording support for the uterus. In this position the uterus-engaging face would appear somewhat as indicated in Fig. 7, the two lower bends, 11, being pushed upward, and the periphery rounded by pressure of the vagina, so that the pack is securely anchored, and movements of the wearer's body cannot cause it to slip downward. For such purposes it is useful to have the handle of the inserting instrument flattened or otherwise marked so as to indicate the direction of the edge-formed faces.

The sheath must have substantial tensile strength, but it may be made of any suitable material such as thin tough paper, having a smooth or more or less glazed surface, and may be lubricated exteriorly by coating and drying thereon any suitable material that is readily softened by water, such as soap, mucilage, gum or starch paste, as indicated at $s$, Figs. 1, 2 and 3. This coating will be moistened just before using. The smooth surface will sufficiently reduce internal friction between the pack and the sheath. Because of its tensile strength, the paper may be wound tightly around the pack to compress the same into its smallest dimensions; and if desired, the sheath may be wrapped more tightly around the base of the pack and less tightly around the forward end thereof.

There are several advantages in making the flexible sheath in the form of a wrapper. The paper stock used does not always have the same elasticity and, in quantity production, it is very difficult to avoid noticeable differences in the expansion elasticities of the packs even after they have been laterally compressed to uniform thickness. Consequently, if the sheaths are of standard size, some of the packs will tend to be too tight in the wrapper and others too loose. On the other hand, it is not difficult to wrap the packs under constant tension of the wrapping paper, so that the fit and resulting friction of the packs in their sheaths are substantially uniform. In doing this by machinery, a spacer may be employed to predetermine the permissible expansion and resulting friction between the pack and the wrapper, after the wrapper has been wound under constant tension and the spacer has been withdrawn.

Another point is that the wrapping can comprise multiple layers. The forward edge of the wrapper is customarily crushed in a bit to facilitate insertion, and the edge tends to fall into folds which have sharp corners. It is these sharp corners that hurt, rather than the free edge of the paper, and I have found that by using a wrapper made in multiple layers, these little sharp folds are very much softer and the individual layers of paper tend to be much softer than one single layer of stiffer paper. For this reason, I also prefer to have no starch on about one-quarter of an inch of the exit end of the sheath, as indicated at $s$, Figs. 1 and 2.

I prefer to make the wrappers from paper of proper width for the length of the pack, and of length sufficient to go about four times around the pack; and have an area sufficient for the outside wrap, or a little more, coated with starch paste, except the quarter inch above described. The non-starched end is wrapped around the pack, and the inner starched surface of the last wrap is pasted down on the layer below, but the unstarched area, about 2¾ wraps, remains dry and unstuck. Such wrapper may be made as a continuous strip. This makes a soft pliable wrapper because the inside and the exit end comprise thin un-stuck layers, each independently flexible, and each foldable inward to form edge curves or corners too soft to be noticeable, and each readily accessible for softening by water.

The slough preventing "cord" or "string" may be any tension member of material not readily disintegrable by water, but a soft loosely twisted string is preferable, and it may be of substantial diameter as indicated in the drawings, so that when tensioned it will have a relatively wide bearing surface on the paper. For the slough preventing tension member 7, the qualities are the same so far as concerns not being readily disintegrable in water, but the other qualities are not so necessary and, as stated, I prefer fine threads.

So far as concerns the combination of the pack with the sheath, it is obviously possible to have the U-bend 16 rearwardly presented, so that the two U-bands 11 and sulcus 8, are forwardly presented. In such cases the ejecting instrument does not have the forwardly extending sulcus engaging member 19. However, if the pad engaging surface of the head 17 is formed as a transverse concave groove, as indicated at 17a, Fig. 14, it will have a partially equivalent directional effect on the pack, and will facilitate the proper insertion and spreading in the upper part of the vagina.

There are other ways of assembling and folding the paper so as to form a pack having a single U-bend at one end and two U-bends at the other end, with a sulcus between the latter. One such way is shown in said Fig. 14, taken in connection with Figs. 9, 9a, on the same sheet. Referring to the latter figures, it will be seen that desired thicknesses of paper may be assembled by piling separate strips in lengths and to thicknesses which will afford the desired thickness of pack after the pile has been folded to form the desired number of the U-bends. In this form the piled strips are folded in the middle at 16w, to form a double thickness strip with a fold at one end only. The same, with folds at both ends, will result if the same length of paper is formed as a relative large ring wound to the same thickness as the pile, and then flattened. In either case, the two ends of the two-layer assembly may be folded inward toward the center to form four layers, and the latter may be then folded to the shape shown in Fig. 9, then flattened to form shown in Fig. 9a, then compressed and wrapped or placed in a sheath, in a final form which will be somewhat as indicated in Fig. 14.

In this Fig. 14, the pack is shown with the two U-bends 11a forwardly presented, and the single U-bend 16a rearwardly presented. In such case, the head 17a of the ejecting instrument may have the concave groove engaging face described above. If the two U-bends 11a are rearwardly presented, obviously the instrument shown in Fig. 3a may be employed, thereby utilizing its forwardly extending portion 19, to form the splice joint giving lateral surface engagement between the inner layers of the pack and effective control of the pack, as described in connection with the Fig. 3.

The above packs, as well as any of the other unsheathed packs hereinafter described, may be employed in combination with the wrapper form of sheath, or with a sheath of relatively stiff material becoming flexible when wet, special forms of which are indicated in Figs. 12 and 13. In cross-section, these may be cylindrical, or they may be flattened toward cross-sections approximating those shown in Figs. 1 and 2.

The forward edges of such stiff material sheath may be thinner down by interior coning as shown at 12y, Fig. 12, or exterior coning as shown at 12z, Fig. 13. In either case, the pack may be projected slightly beyond the thin forward edge, as indicated in Fig. 12, so that the free end of the pack spreads sufficiently to prevent the thin edge from contact with the vagina. If sold with the forward end of the pack within the sheath, either as shown in Fig. 1, or as shown in Fig. 13, the pack may be pushed forward to such protective position by the user, before insertion.

Fig. 4a shows a form of pack which resembles that shown in Fig. 4, in that there is an inner reentrant angle at 8x formed by inner laminae 9x, and a single outer U-bend 16x formed by outer laminae 10x. The reentrant angle 8x is in the nature of a sulcus when the pack is laterally compressed for insertion in the sheath. In this case the inner laminae 9x and outer laminae 10x form two layers instead of four layers; and the ends 11a are ends of separate strips, instead of being reverse bends of a ring. It will be obvious that this pack may be formed by simply piling a multiplicity of strips having a width approximating that desired for the pack, and a length approximating twice that desired for the pack, and then folding the stack to form two layers connected by the U-bend.

In this form the slough preventing threads 7x, are preferably passed through the laminae from side to side, and this may be done before the stack is folded; and the pull cord 3x is preferably looped through the U-bend as shown.

This pack may be used in any of the sheaths or wrappers heretofore described, and may be ejected either end first. If the U-bend is presented toward the exit end of the sheath, the sulcus may be utilized for insertion of the form of ejector shown in Figs. 3 and 3a. On the other hand, if the free ends 11x are presented toward the exit, an ejector such as shown in Fig. 14 may be employed; and in such case projecting the pack slightly beyond the end of the sheath, somewhat as shown in Fig. 12, the free ends of the strips will be particularly effective in expanding over and masking the thin edge of the sheath.

Obviously, there are innumerable other ways in which a paper-like material may be piled, wound, folded, crumpled, or otherwise loosely assembled and shaped or confined in a multiplicity of thicknesses, so that all or most of the adjacent surfaces will be in slip contact relation; and so that when laterally confined, the pack will have substantial stiffness when dry, yet when unconfined will be readily dis-assembled and more or less disintegrated by running water; and so that when released and subjected to endwise pressure in the enlarged upper part of the vagina, there will be more or less bending, unfolding and cracking open and slipping of the surfaces on one another, to form fluid storage interspaces, and to accommodate the shape of the pack to the shape of the cavity, both initially and as a result of movements of the body.

There are also many ways in which the withdrawal member 3 may be detachably associated with or looped around the pack, or an adequate portion thereof; also many ways in which slough preventers may be incorporated, if these are found necessary or desirable.

A few such possibilities are indicated in connection with the remaining figures of the drawings.

The above and all other packs herein described are preferably made by assembling two or more strips so as to have soft projecting edges, and the strips may be of the same width and staggered, as in Fig. 5; or of different widths as in Fig. 5a. Also one or more strips such as shown in Fig. 19 may be twice the width desired for the pack and then folded longitudinally either in the center to make even edge strips; or parallel with the center line, to cause one edge to project more than the other, so as to give the desired soft edges.

Figs. 8 to 8d inclusive indicate diagrammatically how a strip 4c may be of a width a little more than twice that desired for the length of the pack, say, 4 to 6 inches wide. This strip has associated with it, slough preventing threads 7c, running transversely of the strip so as to be lengthwise of the pack as shown in Fig. 8d. These may be spaced at two or three inch intervals, and may be loose or may be very slightly moistened with water soluble paste, either in spots, or throughout their length, so that they will stick to the paper enough to prevent their displacement while forming the packs; or the threads may be stitched through the paper. A length of such paper sufficient to give a pack of the desired volume and absorbent capacity may be made into a pack by loosely rolling the paper as diagrammatically indicated at *x*, Fig. 8*a*, or it may be plicated as indicated at *y*, Fig. 8*b*, or simply crumpled up as indicated at *z*, Fig. 8*c*.

Any one of these assemblies may be bent in the middle as shown in Fig. 8*d*, to form a two-layer pack, having one U-bend 16*c*, and two separate ends 11*c* forming a sulcus 8*c*. In the case of the cylinder form, Fig. 8*a*, or the plicated form, Fig. 8*b*, the slough preventing threads 7*c* will be somewhat as indicated in Fig. 8*d*. In the crumpled form shown in Fig. 8*c*, it is practically impossible to show the irregular disposition of these threads.

The withdrawal cord may be associated with this U-bend-sulcus form of pack, by looping it through the U-bend, as in Figs. 4, 4*a*; or by looping it around the exterior, preferably in spread-out fashion somewhat as shown in Fig. 8*d*. It is not practical to show how tightening, compression and use cause such exterior loops to sink into and effectively engage soft paper surfaces. This arrangement may be used with packs having no U-bend, as for instance, when the piled paper in Fig. 4*a*, is half as long and has twice as many strips.

Fig. 10 diagrammatically indicates a pack formed by transversely folding a single or multiple thickness strip to form plications 4*d* that are the same length as the pack. There may be slough preventing threads in the plications, but these may be omitted because the pull cord 3*d* pierces all plications and is prevented from tearing out by the through-stitching, 7*d*, which holds the plications together at the bottom.

Fig. 21 indicates how slough preventing threads 7*c* may consist of relatively short lengths, but in such case it is desirable to have them tightly held in place by paste moistening, as described in connection with Fig. 8.

Fig. 22 indicates slough preventing threads 7*f* may be irregularly disposed and not fastened to the paper. In all forms, the "thread" may be tape.

Fig. 21*a* shows a U-bend and sulcus form of pack, made by plicating single or multiple thickness strip material as in Fig. 10, but the plications 4*k* will be twice as long and half as thick, so that when folded in the middle it will make a U-bend pack of standard thickness. In this case the slough preventer is gauze 7*k*.

Fig. 16 shows a sheath which may be similar to that shown in Fig. 1, but having compressed therein a pack formed of multiple thicknesses of paper having width suitable for fitting one cross-sectional dimension of the sheath, folded in plications long enough to fit the other cross-sectional dimension, and enough of the plications to make a pack of the desired length. Unless held together by other means, this pack is peculiarly dependent on the sheath for maintaining its shape. There is the advantage, however, that when ejected into the enlarged upper part of the vagina, it tends to unfold more completely and in greater detail than any of the other forms shown.

Fig. 17 indicates diagrammatically, a pack formed by a more or less disorderly mass of scraps of the paper, enclosed in a bag, which in this case is formed from a circular sheet, or several piled sheets, having slough preventing threads extending radially. As indicated in Fig. 22, such circular sheets may have the slough preventing threads running circularly instead of radially.

Figs. 15 and 16 show a pack 16 and a sheath 22 designed as a unit which is adapted for digital insertion and use without ejecting the pack from the sheath. The pack shown is the ring form described in connection with Figs. 1 to 5, but almost any other form of pack may be used.

For such use the sheath is permeable and is preferably made of paper having perforations 23. Preferably the paper is wrapped tightly around the pack and the edges held together sufficiently to permit the sheath and pack to be inserted as a unit. Preferably the sheath is a single thickness of paper, except there may be an overlap at 23, where the edges are secured together. In the drawing, an overlap, secured by paste is assumed. Preferably, the paper is wrapped tightly enough to hold the pack by frictional engagement, and if the wrapper is fastened to the pack, it should be by means not seriously interfering with free passage of liquid through the perforations, into the pack. The wrapper overlap may be small and may be secured by pasting; or by stitching; or by a strip secured across the overlap by water soluble paste, or by a narrow binder encircling the pack. The lubricant coating is preferably applied and dried before the perforations are made.

Preferably the rear end of the sheath projects behind the rear of the pack at 22*a*, but only enough to form a guiding and protecting pocket for enclosing the end of the finger during digital insertion of the unit.

The pull cord 3 may be passed through one or more of the perforations 23; and if protection for the finger is not desired, the rear end of the sheath at 22*a* may be crumpled in against the rear end of the pack or may be pushed into the sulcus 8, either before or after insertion into the vagina.

The wrapper is preferably thin and flexible, so that the pack-sheath unit will be flexible; and preferably the paper is somewhat softenable by water so that it may tend to melt or soften into the pack during use. This is advantageous where the paper is tough enough to hold the pack during insertion, yet softenable enough by soaking so that it will burst open and expose the pack directly to the fluids within a short time after insertion. In such case, the perforations may not be needed.

For all or most of the packs, the preferred type of paper is or has the qualities of those grades of toilet paper which are mostly pure mechanically ground wood pulp, matted, felted or creped with a small percentage of longer-fiber "chemical" pulp. Though commercially known and labeled as "tissue," most such paper is 25% to 50% heavier than the 12-pound limit fixed by some authorities, in their definitions of "tissue" paper. This is one of the reasons why it has the slight but very desirable degree of initial stiffness whereby when assembled in an elongated pack embodying a multiplicity of relatively movable contact surfaces, and is folded or bent, the individual layers or piles tend to separate or "crack"; by reason of their different arcs of curvature, thereby affording thin capillary spaces between them, adapted to hold substantial amounts of fluids by film tension, in addition to that held capillarly in the pores of the paper.

Preferably, the paper is somewhat crinkled or creped in addition to being heavier than the very thin, smooth-surfaces, strictly "tissue" types of toilet paper. The crinkled or creped surface also contributes to initial interlayer, film-holding spaces.

The advantages in having the absorbent material mostly pure mechanically ground wood pulp embodied in very porous paper, are that the ground wood fiber absorbs and holds liquid in the substance of each fiber; also by capillarity in the pores between fibers; also by film tension between adjacent surfaces of the paper. It is only this latter load that can become too great to be safely retained when abnormal body pressures are applied.

This is in contrast to cotton, and some other similar materials wherein the substance of the fiber does not absorb liquid, and absorption is only by film tension on the surfaces of the fibers, and/or capillarity between fibers. Such materials easily become fully loaded when subjected to normal or subnormal pressures in the vagina, and when the pressure increases they easily give up excess load. Consequently, while cotton normally tends to absorb water at phenomenal speed, nevertheless, under varying vaginal pressures, it easily gives up its load; that is to say, in the vagina, its practically effective holding capacity is correspondingly limited. Furthermore, such absorption causes relatively great increase in volume of such materials, as compared with packs made of my preferred materials.

A serious objection to cotton which will be best appreciated by physicians is that under certain conditions of saturation and varying pressures in the vagina, the cotton may become relatively hard, thereby causing discomfort. Moreover, the exterior surface of the cottom becomes much smoother and more slippery than is the case with my paper packs, the net result being that hard slippery portions of a cottom pack can easily slip downward in the vagina far enough to hold open the mouth of the vagina, thereby making the cavity accessible to various infections; or, less dangerous but more disconcerting, the cotton pack may be partly or wholly ejected.

It follows that while some "chemical" pulp, or cellu-cotton, or cotton, may be used in my packs, or incorporated in the paper for certain purposes; or in the pack for use under certain conditions, particularly where the flow is small, or the pack may be frequently changed, a pack consisting mostly of mechanically ground wood fiber is far superior in all the respects above pointed out.

So it will be obvious that my invention includes the discovery that when paper-like material which is very porous and which consists mostly of mechanically ground wood fiber, is packed into the vagina, it operates by a specifically new method as concerns holding, as well as absorbing vaginal discharges; and that when in the form of thin paper, loosely assembled so as to embody a multiplicity of adjacent surfaces in slip contact with one another, the holding capacity of the pack is practically increased because when increased local pressures are applied by movements of the body, the pack tends to yield and change shape, rather than to be compressed and lose its intersurface load. This is in addition to comfort due to automatic fitting of the pack to the cavity.

I claim:

A catamenial device suitable for insertion in the vagina comprising an oblong-shaped tampon pack and a sheath for the same the two taken together capable of sustaining endwise pressure without distortion, although neither said pack nor said sheath is individually capable of withstanding endwise pressure without distortion; said pack comprising a multiplicity of superposed thin relatively movable laminae of vegetable matter of the type that is very porous and when soaked weakens, tearing so easily that the pack is readily disintegrable in running water; said sheath around the pack being flexible enough to conform partly to the shape of the pack although frictionally holding the laminae thereof in compact form during transportation and insertion in the vagina but being insufficiently stiff to permit insertion independently of the pack within it, said sheath having a portion projecting at one end of the pack which is of sufficient tensile strength to serve as a tension member to sustain the tension on the sheath when the pack is forcibly ejected therefrom.

FREDERICK ALEXANDER ROSS.